(12) United States Patent
Jones, Jr.

(10) Patent No.: US 7,931,107 B2
(45) Date of Patent: Apr. 26, 2011

(54) VEHICLE KINETIC ENERGY UTILIZATION TRANSMISSION SYSTEM

(76) Inventor: John Jones, Jr., Delray Beach, FL (US)

( * ) Notice: Subject to any disclaimer, the term of this patent is extended or adjusted under 35 U.S.C. 154(b) by 0 days.

(21) Appl. No.: 12/657,942

(22) Filed: Jan. 30, 2010

(65) Prior Publication Data

US 2010/0193273 A1 Aug. 5, 2010

Related U.S. Application Data

(60) Provisional application No. 61/149,077, filed on Feb. 2, 2009.

(51) Int. Cl.
*B60K 6/10* (2006.01)
(52) U.S. Cl. .......................................................... 180/165
(58) Field of Classification Search .................. 180/165, 180/65.31, 54.1, 60
See application file for complete search history.

(56) References Cited

U.S. PATENT DOCUMENTS

| | | | | |
|---|---|---|---|---|
| 2,118,590 | A * | 5/1938 | Chilton | 475/266 |
| 3,672,244 | A * | 6/1972 | Nasvytis | 477/37 |
| 4,282,947 | A * | 8/1981 | Kemper | 180/165 |
| 4,583,505 | A * | 4/1986 | Frank et al. | 123/198 F |
| 4,625,823 | A * | 12/1986 | Frank | 180/165 |
| 6,935,987 | B1 * | 8/2005 | Booth, Jr. | 476/4 |
| 6,962,223 | B2 * | 11/2005 | Berbari | 180/165 |
| 7,540,346 | B2 * | 6/2009 | Hu | 180/165 |

* cited by examiner

*Primary Examiner* — J. Allen Shriver, II
*Assistant Examiner* — James Triggs
(74) *Attorney, Agent, or Firm* — Stuart M. Goldstein

(57) ABSTRACT

The kinetic energy utilization transmission system is installed on a vehicle having a prime mover, a chassis with four wheel suspension system, a gear differential and opposing pinion input shafts, lateral wheel drive axles, drive wheels, and braking mechanism. The system includes a torque modulator configured for engagement and disengagement with an overdrive gear transmission operably connected to a flywheel or flywheel system. Upon application of the braking mechanism, the vehicle decelerates, the resultant vehicle generated kinetic energy being transmitted to the flywheel via the modulator and overdrive transmission, which multiplies the rotation, i.e. input RPM's, received from the modulator. In so doing, the overdrive transmission maximizes available braking effect. As the vehicle is decelerated by the transfer of energy to the flywheel, the loss of speed is compensated for by the proportionally increasing torque demand through the modulator which, in conjunction with the step-up from the overdrive transmission, enables the continuation of flywheel acceleration and thus energy storage. This stored energy is transmitted back through the system to the drive wheels. The overdrive transmission also acts as a step-down transmission when kinetic energy is drawn from the flywheel to provide power to accelerate the vehicle.

8 Claims, 2 Drawing Sheets

US 7,931,107 B2

VEHICLE KINETIC ENERGY UTILIZATION TRANSMISSION SYSTEM

This application claims the benefit of parent application Ser. No. 61/149,077 filed on Feb. 2, 2009.

FIELD OF THE INVENTION

The present invention relates to an efficient, infinitely variable transmission system for the capture, conservation, and re-utilization of waste kinetic energy.

BACKGROUND OF THE INVENTION

Motorized ground based wheeled vehicles capable of substantial velocity accumulate significant, essentially linear, kinetic energy during their operation. The achievement of this kinetic energy requires the expenditure of comparatively greater energy units of fuel in order to overcome inertial forces which tend to restrain the mass of the vehicle. Conversely, the attained energy of the mass-velocity is totally lost to the heat of braking and other unrecoverable retardant forces in each velocity deceleration cycle.

Capture of linear kinetic energy resulting from deceleration sources, by use of absorbed flywheel energy, has been attempted with limited success. There have been systems which attempt to overcome the problems of utilizing a workable flywheel energy conservation system by the introduction of continuously variable-ratio transmissions into the power flow path. While working models exist of such systems, they have severe limitations as to size, drag, efficiency, durability, and complexity. That such transmissions are needed is predicated upon the fact that in either power flow direction, the source of energy is caused to lose speed as it transfers energy to the opposing body, either the flywheel to vehicle or the vehicle to the flywheel. In order to work, the system must overcome this physical reality, that is a first mass traveling at an initial velocity, while being drained of energy and thus slowing, must continue to accelerate a second mass. This result must be accomplished while the mass velocity of the first mass, the vehicle, is being used to accelerate the second mass, the flywheel, and conversely while the mass velocity of the flywheel is being used to accelerate the vehicle.

SUMMARY OF THE INVENTION

It is thus the object of the present invention to provide a system which enables the conversion of linear kinetic energy of a vehicle into rotational kinetic energy for short period storage; and the recapture of much of this energy by its reconversion back into linear velocity of the vehicle. With respect to automotive applications, this system is applicable to front wheel, rear wheel, four wheel, and all wheel drive systems.

More specifically, the objective of the system of the present invention is to first efficiently absorb kinetic energy from an already moving vehicle, preserving this energy while the vehicle is slowed or stopped, and then efficiently returning it to the vehicle by causing it to reaccelerate. In operation, when this energy is absorbed it becomes stored in a mass, here a flywheel, by causing the flywheel to accelerate in rotation. There is realized in the initiating phase of the process less and less energy in the form of velocity remaining in the mass of the vehicle, as it is caused to slow from its initial velocity by the transfer of energy from it to the connected flywheel.

In accordance with the law of conservation of momentum, the increase in the kinetic energy of the flywheel is required to be inversely proportional to that which is lost by the vehicle. For this to be accomplished, as the speed of the energy source decreases, some transmission mechanism has to function to continuously increase the input speed to the flywheel, even though the source speed continues to decrease. This conundrum also exists when the flywheel becomes the power source and its speed is draining off while converting its kinetic energy into acceleration of the vehicle. In this case as well, the vehicle is speeding up while the rotation of the flywheel decreases. Similarly, a transmission mechanism must be employed in this phase of the operation to, in effect, convert a decelerating function into an accelerating function.

To accomplish these objectives, the system of the present invention is to be installed on a vehicle having an electric or fuel power prime mover, a chassis with four wheel suspension system, a gear differential with opposing pinion input shafts, lateral wheel drive axles, drive wheels, and braking mechanism. The system includes a torque modulator configured for engagement and disengagement with an overdrive gear transmission operably connected to a lightweight flywheel or flywheel system. Upon initiation of the braking cycle, the vehicle decelerates by the resultant vehicle generated kinetic energy being transmitted to the flywheel via the modulator and overdrive transmission, which multiplies the rotation, i.e. input RPM's, received from the modulator. In so doing, the overdrive transmission maximizes available braking effect. As the vehicle is decelerated by the transfer of energy to the flywheel, the loss of speed, or RPM's, is compensated for by the proportionally increasing torque demand through the modulator which, in conjunction with the step-up from the overdrive transmission, enables the continuation of flywheel acceleration and thus energy storage. In the return cycle, this stored energy is transmitted back through the system to the drive wheels. The overdrive transmission also acts as a step-down transmission when kinetic energy is drawn from the flywheel to provide power to accelerate the vehicle.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
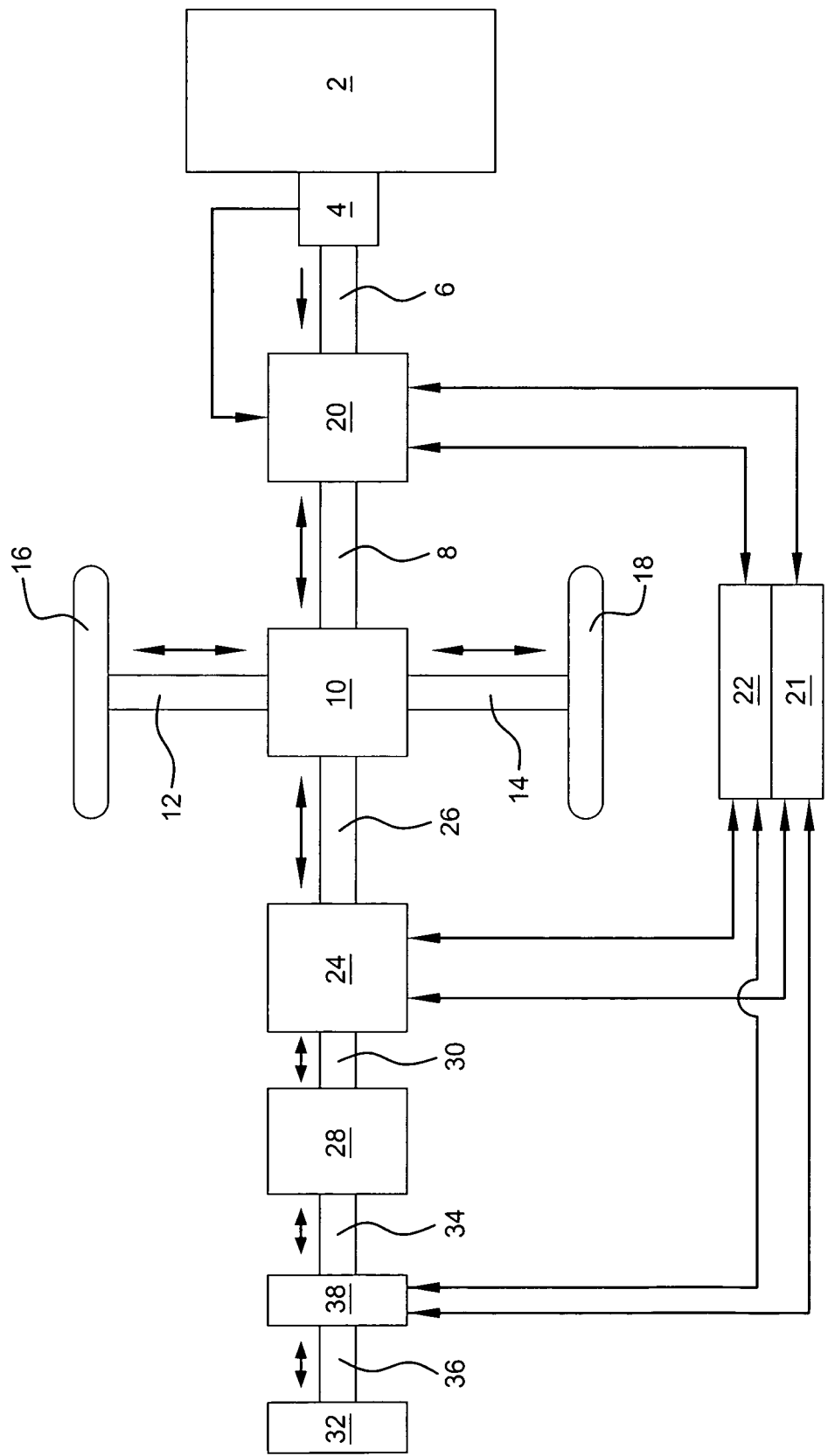
FIG. 1 is a basic, schematic representation of the system of the present invention incorporated into a vehicle with an engine and conventional transmission.

The kinetic energy utilization transmission system of the present invention, schematically represented in FIG. 1, is readily adaptable to an existing motor vehicle transmission system comprising prime mover (engine) 2, conventional gear-change transmission and clutch 4, drive shaft with appropriate connections 6, differential pinion shafting 8, gear differential assembly 10, drive axles 12 and 14 and driven wheels 16 and 18. Bi-directional clutch with reverse drive lockup 20 is provided in the system between drive shaft 6 and differential pinion shafting 8 to control the rotational output of the prime mover 2, as described in further detail hereinafter. Vehicle speed control, i.e. accelerating and braking, is represented at 21 and 22 respectively, in FIG. 1.

System 1 comprises torque modulator 24 connected to gear differential assembly 10 by modulator differential pinion shafting 26. Overdrive transmission 28 is connected to modulator 24 via overdrive transmission shaft 30 and ultimately to flywheel 32 via flywheel shafting 34 and 36. Bi-directional clutch 38 interconnects this shafting.

Figure 2:
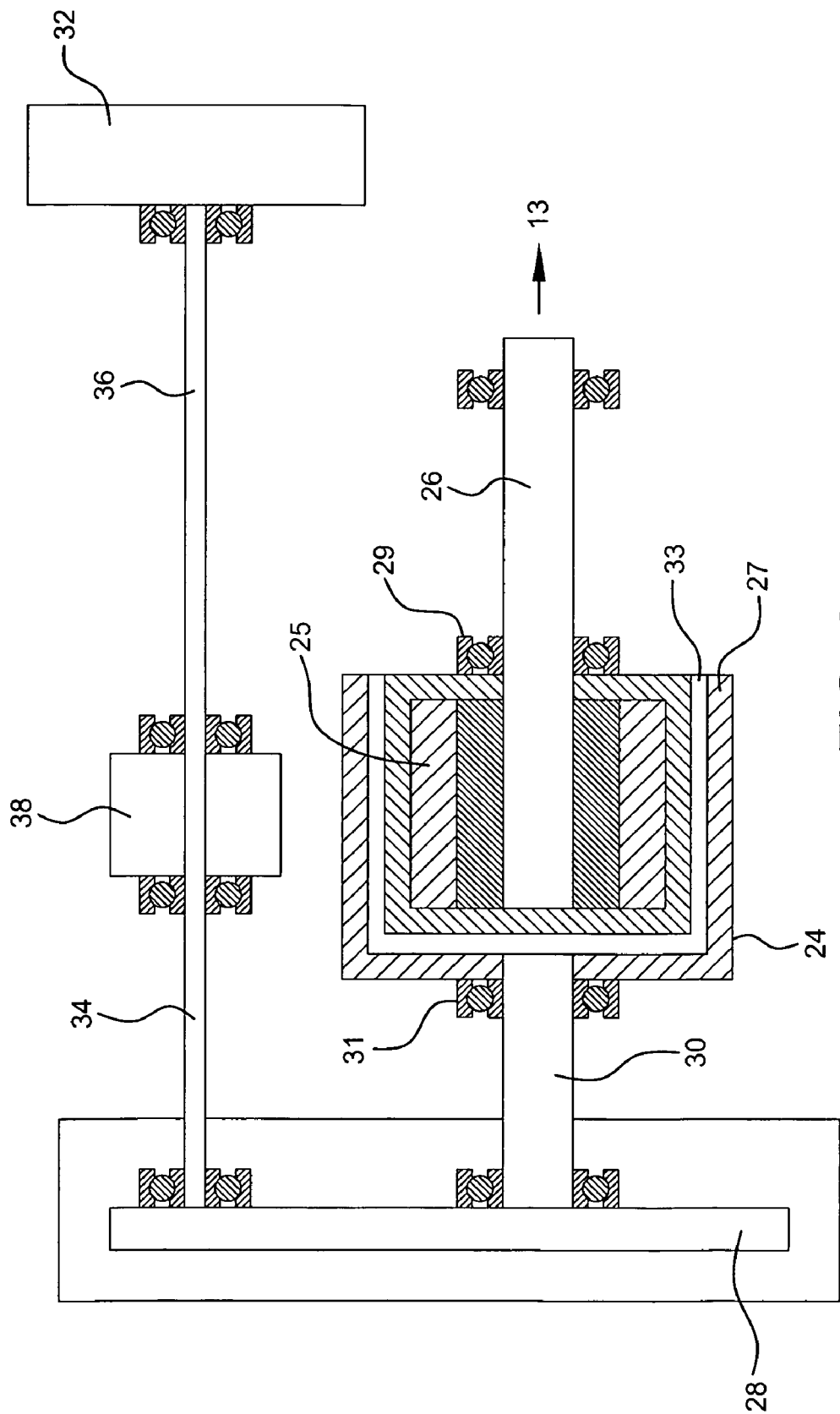
FIG. 2 shows the torque modulator-overdrive transmission flywheel components of the present invention, in partial cross-section.

Modulator 24 is provided to engage and disengage overdrive transmission 28 and hence flywheel 32, upon input received from braking mechanism 22. It is contemplated that modulator 24 will be a device capable of infinitely slipping or throughputting rotational speed to shaft 30. An example of this type of device is the drive selection unit described in U.S. Pat. No. 5,446,327. As seen in FIG. 2, modulator 24 is basically an induction mechanism consisting of two independent co-axial bearing mounted rotating interfaced sections which operate on the principals of magnetic induction. These two elements, electromagnet multi-pole rotor 25 and steel drum armature rotor 27, are separated by mounting shaft bearings 29 and 31 which maintain a constant air gap 33 between the two elements. There is no physical connection between electromagnet 25 and rotor 27. When current is applied to the coil of the electromagnet 25, a polarized field is produced, magnetically coupling both elements, the electromagnet and rotor 27, and causing the output element to turn in the same direction as the input shaft, e.g. pinion shafting 26, the connection 13 of which goes to wheels 16 and 18.

Output torque extended on the output shaft is dependent on the strength of the magnetic field, which is proportionally controlled by varying the amount of current applied to electromagnet 25. Thus full slip, zero torque throughput, to near 100% torque throughput is variable in fully controllable infinitely adjustable increments. Importantly, power flow is reversible in that the torque input shaft may become the torque output shaft and the torque output shaft may concurrently become the torque input shaft. In this manner, modulator 24 establishes a mechanical connection following receipt by electromagnet 25 of an electrical signal. Upon actuation of braking mechanism 22 (when the driver of motor vehicle steps on the brake pedal), the electrical signal is sent to modulator 24 which causes it to connect or engage shaft 30 and ultimately overdrive transmission 28.

While an electrically actuated modulator 24 is preferred, a mechanically operated device can also be utilized. In this case, actuating brake mechanism 22 will act against a spring or similar pressure to close the two normally separate rotatable elements which comprise modulator 24, thereby providing engagement with shaft 30.

Shaft 30 is engaged by modulator 24 for rotation based on the kinetic energy resulting from the deceleration of the vehicle. Overdrive transmission 28, through shaft 30, is provided to impact rotational speed step-up input to flywheel 32 and a speed step-down transmission when drawing stored kinetic energy from the flywheel to provide torque or power to accelerate the vehicle. Thus, overdrive transmission 28 acts as an over-drive speed increaser when power flows from the vehicle to flywheel 32 and a reduction-gear speed reducer when power flows from the flywheel to the vehicle. In this mode, upon vehicle acceleration via control 21, energy flows to bi-directional clutch 20, which controls power output of prime mover 2.

The application of variable torque to an overdrive transmission facilitates the achievement of increased RPM to the output shafting. This multiplied RPM can be used to store considerable energy in the attached flywheel. The flywheel, being relatively lightweight and minor in mass, can be driven effectively to speed, although the overdrive transmission presents a mechanical disadvantage to the system when charging the flywheel with energy. On the other hand, when the energy flow is in the opposite direction, that is, from the flywheel to the vehicle, the subject overdrive transmission offers significant mechanical advantage, enabling the acceleration of the vehicle against its superior mass.

Bi-directional clutch 38 permits the speed-up input energy to be absorbed by flywheel 32 and also allows it to be transmitted back through to overdrive transmission 28 to provide torque or power to accelerate the vehicle.

In summary, upon application of braking mechanism 22, the vehicle decelerates and this resultant vehicle generated kinetic energy is transmitted to flywheel 32 via torque control by modulator 24 and overdrive transmission 28, which multiplies the rotation, i.e. input RPM's, received from the modulator. In so doing, overdrive transmission 28 maximizes available energy absorption and braking effect. Therefore, as the vehicle is decelerated by the transfer of energy to flywheel 32, the loss of speed, or RPM's, is compensated for by the proportionally increasing torque demand through modulator 24 which, in conjunction with the step-up from overdrive transmission 28, enables the continuation of flywheel acceleration and thus energy storage. This stored energy is transmitted back through the system to drive wheels 16 and 18. As an additional benefit of system 1, when the vehicle is being accelerated, i.e. by stepping on accelerator 21, energy stored by flywheel 32 is redirected, via bi-directional clutch 38, to provide power to assist prime mover 2.

For system 1 of the present invention to work successfully, prime mover 2 must function independently to power the vehicle without interference, drag, or loading by other systems, but must also, if optionally elected, function concurrently with flywheel 32 when the system is in operation to accelerate the vehicle. This situation is addressed by bi-directional clutch 20 which permits power to flow to gear differential assembly 10 when the speed of drive shaft 6 otherwise exceeds the speed of differential pinion shafting 8. In other words, bi-directional clutch 20 is intended to lock and thus connect prime mover 2 and transmission 4 to differential assembly 10 through shaft 8 only when the transmission is in a forward drive gear and only when the RPM of shaft 6 exceeds that of shaft 8. Thus bi-directional clutch 20 will automatically discontinue the mechanical power connection whenever shaft 8 RPM equals or exceeds that of shaft 6. This prevents shaft 6, transmission 4, and prime mover 2 from sapping kinetic energy from flywheel 32.

In addition, flywheel 32 is effectively disconnected from modulator differential pinion shafting 26 and modulator 24 when the modulator is turned off. Mechanically and/or electronically sensed and triggered, this disconnected state results whenever the connected pinion shaft speeds match or exceed the speed of modulator 24.

Moreover, flywheel 32 and its operational components need to function without interference from prime mover 2 and its components to enable the absorption and storage of energy. As previously stated, bi-directional clutch 20 automatically severs the remainder of the drive train system from prime mover 2 whenever the speed of prime mover shaft 6 is less than the connected differential pinion speed.

Flywheel 32 also must operate without interference from prime mover 2 in order to independently or concurrently work in conjunction with the prime mover to reenergize the vehicle. Once again, bi-directional clutch 20 allows prime mover 2 to idle without drag on flywheel 32 or, if power is applied by the vehicle operator, drive its differential pinion in concert with the flywheel.

Prime mover 2 must be prevented from offering energy wasting drag during vehicle deceleration, when the maximum possible energy is stored by the flywheel. Differential pinion shafting 8 is thus cause to "freewheel" with respect to prime mover 2, by bi-directional clutch 20.

Fundamentally, flywheel 32, in order to attain reasonable levels of energy storage, must be excited to ever increasing speed during charging, i.e. vehicle deceleration. As previously described, while the vehicle is being slowed by the energy transfer to flywheel 32, the flywheel must be made to inversely accelerate to ever faster speeds. Also as discussed, this is accomplished by modulator 24 acting through overdrive transmission 28. Modulator 24 inputs rotational speed, RPM, to overdrive transmission 28. The resulting output speed is the product of the percentage of RPM throughput of modulator 24, times the up-gearing ratio of overdrive transmission 28. As an example, if modulator pinion shafting 26 is turning at 500 RPM's and modulator 24 is allowing a slippage of 50%, and the gear ratio is hypothetically 1:6, there is a potential of 250 times 6 or 1500 RPM into the flywheel, to which it is connected in line further on. Modulator 24, as conceived, is capable of from 0% to nominally 100% torque throughput and is instantaneously and continuously variable with respect to this characteristic. Thus, in this example, the realized output to flywheel 32 can be modulated between 0 RPM and a six fold multiplication of the pinion shafting 26 input speed.

As flywheel 32 cannot instantaneously respond to RPM input, modulator 24 serves as a variable torque drive transmission to flywheel 32, causing it to accelerate without the need for conventional gear or other such type ratio changes. Therefore, system 1 is a continuously variable ratio torque drive transmission. In operation, to effect the results required, as the source speed decreases, modulator 24 increases the percentage torque throughput thereby realizing, via overdrive transmission 28, a continuous increase of resultant output speed to flywheel 32, and, within limits, contravening the problem of declining input source speed. In a similar context, during energy transfer when the vehicle is being reaccelerated and increasing in speed, flywheel 32 will be losing speed, but must continue to offer energy to the vehicle to further accelerate it, as previously described.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A kinetic energy utilization transmission system for providing auxiliary power to a motor vehicle having a prime mover with rotating drive shaft, a gear differential with opposing shafting, and a braking mechanism, said system comprising:

flywheel means for the absorption and storage of kinetic energy caused by vehicle deceleration;

modulating means for receiving vehicle deceleration data upon actuation of the braking mechanism and, upon receiving said deceleration data, for engaging and rotating the shafting and for producing zero full slip torque throughput to substantially 100% torque throughput to the shafting in controllable infinitely adjustable increments, said modulating means comprising dual rotatable elements separated by a constantly maintained air gap which separates the elements, said rotatable elements receiving said data and causing the engagement and rotation of the shafting from said zero full slip torque throughput to said 100% torque throughput; and overdrive transmission means connected to the modulating means through said shafting for providing the absorption and storage of kinetic energy to the flywheel means by rotational speed step-up to an acceleration of the flywheel means, whereby the accelerated rotation of the flywheel means is transmitted as amplified torque to the gear differential as auxiliary power to re-accelerate the vehicle.

2. The kinetic energy utilization transmission system as in claim 1 wherein the modulating means is electrically actuated upon deceleration of the vehicle.

3. The kinetic energy utilization transmission system as in claim 1 wherein the modulating means is mechanically actuated upon deceleration of the vehicle.

4. The kinetic energy utilization transmission system as in claim 1 further comprising clutch means for controlling the rotational power from the prime mover drive shaft to the gear differential.

5. The kinetic energy utilization transmission system as in claim 4 wherein the opposing rotating shafting comprises differential pinion shafting means for transmitting rotational power from the clutch means to the gear differential, whereby the clutch means allows rotational power to the gear differential when the rotational speed of the prime mover drive shaft exceeds the rotational speed of the differential pinion shafting means, and the clutch means disconnects rotational power from the prime mover drive shaft to the gear differential when the rotational speed of the prime mover shaft is less than the rotational speed of the differential pinion shafting means.

6. The kinetic energy utilization transmission system as in claim 1 wherein the opposing rotating shafting comprises overdrive transmission shafting means for transmitting rotational power from the modulating means to the gear differential when the braking mechanism is actuated and the vehicle decelerates.

7. The kinetic energy utilization transmission system as in claim 5 wherein the opposing rotating shafting comprises overdrive transmission shafting means for transmitting rotational power from the modulating means to the gear differential when the clutch means disconnects rotational power from the prime mover drive shaft to the gear differential.

8. The kinetic energy utilization transmission system as in claim 1 wherein the overdrive transmission means further provides for speed step-down transmission of stored kinetic energy from the fly wheel means to provide reacceleration of the vehicle.

* * * * *